United States Patent
Reynolds et al.

(10) Patent No.: US 11,979,110 B2
(45) Date of Patent: May 7, 2024

(54) SOLAR PANEL MOUNTING ASSEMBLY

(71) Applicants: CANADIAN SOLAR (USA) INC., Walnut Creek, CA (US); CSI Solar Co., Ltd., Suzhou (CN)

(72) Inventors: Charles Jonathan Reynolds, Walnut Creek, CA (US); George Kuo, Walnut Creek, CA (US)

(73) Assignees: Canadian Solar (USA) Inc., Walnut Creek, CA (US); CSI Solar Co., Ltd., Suzhou (CN)

( * ) Notice: Subject to any disclaimer, the term of this patent is extended or adjusted under 35 U.S.C. 154(b) by 290 days.

(21) Appl. No.: 17/668,244

(22) Filed: Feb. 9, 2022

(65) Prior Publication Data

US 2022/0271707 A1    Aug. 25, 2022

Related U.S. Application Data

(60) Provisional application No. 63/148,255, filed on Feb. 11, 2021.

(51) Int. Cl.
*H02S 30/10* (2014.01)
*F24S 25/60* (2018.01)
*H02S 20/20* (2014.01)

(52) U.S. Cl.
CPC .............. *H02S 30/10* (2014.12); *F24S 25/60* (2018.05); *H02S 20/20* (2014.12)

(58) Field of Classification Search
None
See application file for complete search history.

(56) References Cited

U.S. PATENT DOCUMENTS

| | | | |
|---|---|---|---|
| 8,413,944 B2 * | 4/2013 | Harberts | F24S 25/65 248/500 |
| 8,894,424 B2 * | 11/2014 | DuPont | H02S 20/22 439/95 |
| 9,803,893 B2 * | 10/2017 | Giraudo | F24S 25/67 |
| 10,205,418 B2 * | 2/2019 | Nayar | F24S 25/60 |
| 10,305,416 B2 * | 5/2019 | Zhu | H02S 20/23 |
| 10,340,837 B2 * | 7/2019 | Wildes | F24S 25/636 |
| 10,622,935 B1 * | 4/2020 | Liu | H02S 30/00 |
| 10,707,803 B2 * | 7/2020 | Pretorius | H02S 99/00 |
| 10,756,668 B2 * | 8/2020 | Bamat | H02S 30/00 |
| 10,801,755 B1 * | 10/2020 | Nemat | F24S 25/634 |
| 10,931,225 B2 * | 2/2021 | Yang | F16M 13/022 |
| 10,992,250 B2 * | 4/2021 | Ayers | H02S 40/22 |
| 11,271,518 B2 * | 3/2022 | Ballentine | H02S 30/00 |
| 11,296,648 B1 * | 4/2022 | Jasmin | F16B 5/0233 |
| 11,447,954 B2 * | 9/2022 | McDonald | E04D 3/366 |
| 11,486,434 B2 * | 11/2022 | Kovacs | F16C 29/123 |
| 11,502,638 B2 * | 11/2022 | Watson | F24S 25/20 |
| 11,606,060 B2 * | 3/2023 | Reynolds | H02S 30/10 |
| 2014/0294493 A1 * | 10/2014 | Cavieres | F24S 25/632 403/327 |
| 2015/0135608 A1 * | 5/2015 | Shibata | F24S 25/615 52/173.3 |
| 2018/0138854 A1 * | 5/2018 | Zhu | H02S 30/00 |

\* cited by examiner

*Primary Examiner* — Joshua K Ihezie
(74) *Attorney, Agent, or Firm* — Foley & Lardner LLP

(57) ABSTRACT

This disclosure generally relates to solar module mounting and racking. More specifically, this disclosure relates to integrated solar racking systems, which facilitate slide and snap in place mounting technology that achieves solar module mounting and electrical grounding. This design eliminates the need for mounting fasteners and tools, and facilitates reliable and repeatable installation.

18 Claims, 12 Drawing Sheets

SOLAR PANEL MOUNTING ASSEMBLY

CROSS-REFERENCE TO RELATED PATENT APPLICATION

This application claims the benefit of and priority to U.S. Provisional Patent Application No. 63/148,255, filed Feb. 11, 2021, which is incorporated herein by reference in its entirety.

BACKGROUND

A solar panel is a packaged assembly of photovoltaic cells. Solar panels use light energy (e.g., photons) from the sun to generate an electric current via the photovoltaic effect. A solar panel is typically used to generate and supply electricity to a load device or system. Solar panels are an environmentally-friendly alternative to other sources of energy such as coal, oil, or gasoline.

Solar modules (e.g., a solar panel and frame assembly including frame mounting devices) are typically mounted to racking equipment (e.g., rails thereof) using fastening hardware. Solar mounting rails and fastening hardware must provide adequate mounting to accommodate design loads, as well as provide electrical grounding connections to each solar module. Typical fastening hardware includes nuts, bolts, and washers; rivets; or clamps. Existing fastening hardware require tools that add to labor and overhead expenses (e.g., to purchase and transport torque wrenches, batteries, compressors, pneumatic hoses, etc.). Also, mounting clamps are costly and require hammering onto a frame rail of the solar module, which increases the potential for installation damage.

SUMMARY

One embodiment relates to a solar racking system. The solar racking system includes a rail, a clamp assembly, and a grounding lock. The rail has a bottom wall and a sidewall extending upward from the bottom wall. The clamp assembly is configured to couple the rail to a support. The grounding lock includes an arm having a first end and an opposing second end, a mounting interface coupling the arm to the sidewall, a grounding interface extending from the arm between the first end and the opposing second end, and a locking interface extending from the opposing second end. The rail and the grounding lock are configured to engage with a frame assembly of a solar module to (i) ground the solar module and (ii) provide fastener-less mounting of the solar module.

Another embodiment relates to a solar racking system. The solar racking system includes a first rail assembly and a second rail assembly. The first rail assembly and the second rail assembly are configured to engage with a solar module. Each of the first rail assembly and the second rail assembly includes a mounting rail, a first clamp arm, a second clamp arm, and a grounding lock. The mounting rail includes a bottom wall, a first sidewall extending from a first longitudinal edge of the bottom wall, a second sidewall extending from an opposing second longitudinal edge of the bottom wall, a first lip extending from a first free end of the first sidewall, and a second lip extending from a second free end of the second sidewall. The bottom wall, the first sidewall, and the second sidewall define an internal volume. A longitudinal opening is defined between the first lip and the second lip. At least one of the first lip or the second lip defines a locking aperture. The bottom wall defines a first clamp aperture and a second clamp aperture. The first clamp arm has a first end and a second end. The first end includes a first retainer that engages with the first clamp aperture of the mounting rail. The second clamp arm has a third end and a fourth end. The third end includes a second retainer that engages with the second clamp aperture of the mounting rail. The second end of the first clamp arm and the fourth end of the second clamp arm are selectively coupled together. The grounding lock is disposed within the internal volume of the mounting rail. The grounding lock includes a locking interface, a grounding interface, and a mounting interface coupled to one of the first sidewall or the second sidewall. The locking interface is configured selectively retract from the locking aperture and bias back through the locking aperture to secure the solar module in position along the mounting rail. The grounding interface is configured to bias into engagement with a portion of the solar module to facilitate electrically grounding the solar module.

Still another embodiment relates to a solar racking system. The solar racking system includes a solar module and a racking assembly. The solar module includes a frame assembly. The frame assembly includes a frame and a frame channel. The frame defines first interfaces. The frame is configured to support a solar panel. The racking assembly is configured to couple the solar module to a support. The racking assembly includes a plurality of rail assemblies configured to be arranged consecutively along the support. The plurality of rail assemblies include a first rail assembly and a second rail assembly. Each of the plurality of rail assemblies includes a mounting rail, a clamp configured to couple the mounting rail to the support, and at least one grounding lock (e.g., one, two, etc.). The mounting rail defines an internal volume, a longitudinal opening that receives the frame channel of the frame assembly such that the frame channel extends into the internal volume of the mounting rail when the frame assembly engages with the first rail assembly and the second rail assembly, and a second interface positioned to align with a respective one of the first interfaces of the frame. The at least one grounding lock is disposed within the internal volume of the mounting rail. The grounding lock includes a mounting flange coupled to an interior surface of the mounting rail, a locking arm extending from the mounting flange and terminating with a locking flange, and a grounding interface extending from the locking arm proximate the mounting flange. The grounding interface terminates with an electrical grounding contact (e.g., having teeth, capable of penetrating a coating or outer surface on the frame channel, etc.). The locking flange extends through the respective one of the first interfaces of the frame and the second interface of the mounting rail. The electrical grounding contact is positioned to engage with the frame channel extending into the internal volume of the mounting rail to facilitate electrically grounding the frame assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a solar panel system of the present disclosure includes a solar panel mounting assembly that facilitates fastener-less mounting of a solar module to a support (e.g., a torque tube, etc.). Specifically, the solar panel mounting assembly eliminates the need to use traditional fasteners (e.g., rivets, bolts, etc.) or clamps to secure a solar module to a mounting assembly for the solar module. Such a fastener-less design may be cheaper, quicker, and easier to install, provide more a repeatable installation process, mitigate damage during installation that can occur with designs that require fasteners or clamps, and require less tools than traditional fastener-based designs. There have been very few efforts in the industry to provide products that eliminate and/or reduce the use of fasteners to reduce labor, overhead cost, and material cost. All products currently on the market today require multiple fasteners per solar module to secure the solar module to racking. A solar module that can be installed with no tools or fastener materials is not offered in today's solar racking market.

Figure 1:
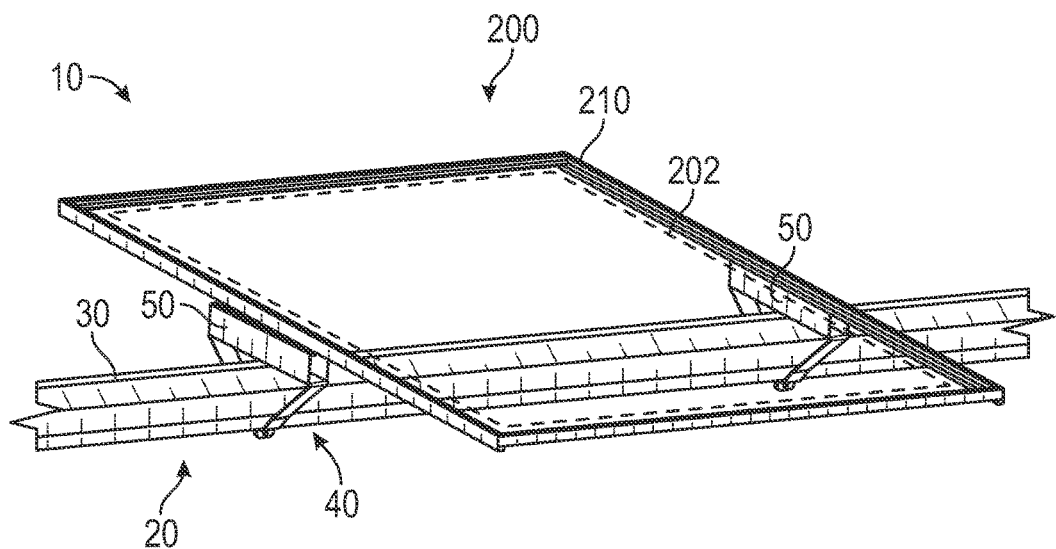
FIG. 1 is a perspective view of a solar racking system having (i) a racking assembly including a support and a mounting assembly and (ii) a solar module including a frame assembly and a solar panel, according to an exemplary embodiment.

As shown in FIG. 1, a solar panel system, shown as solar racking system 10, includes a solar panel mounting, support, or racking assembly, shown as racking assembly 20, and a solar panel assembly, shown as solar module 200. The racking assembly 20 includes a support (e.g., an elongated mounting support, a tube, a support tube, bar, etc.), shown as torque tube 30, and a solar mounting module, shown as mounting assembly 40. The mounting assembly 40 includes a pair of mounting rail assemblies, shown as rail assemblies 50, which are spaced a select distance apart along the torque tube 30. The rail assemblies 50 are configured to support and couple the solar module 200 to the torque tube 30. In some embodiments, the racking assembly 20 includes a plurality of mounting assemblies 40 and associated rail assemblies 50 spaced along the torque tube 30 to facilitate supporting a plurality of solar modules 200. In some embodiments, adjacent solar modules 200 share a common rail assembly 50 along adjacent edges thereof (e.g., a first solar module 200 is supported by a first rail assembly 50 and a second rail assembly 50, a second solar module 200 is supported by the second rail assembly 50 and a third rail assembly 50, etc.).

As shown in FIG. 1, the solar module 200 includes a photovoltaic module, shown as solar panel 202, supported by a peripheral frame assembly, shown as frame assembly 210. The frame assembly 210 facilitates coupling the solar panel 202 to the rail assemblies 50 of the mounting assembly 40. According to an exemplary embodiment, the solar panel 202 includes a plurality of photovoltaic cells configured to receive and convert solar power (e.g., light energy, etc.) from a light source (e.g., the sun, etc.) to generate electrical power. The generated electrical power may be provided to charge and/or power a load. The power output of the solar racking system 10 may be related to a surface area of the solar panels 202 thereof and/or a relative orientation between the solar racking system 10 and the light source.

Figure 2:
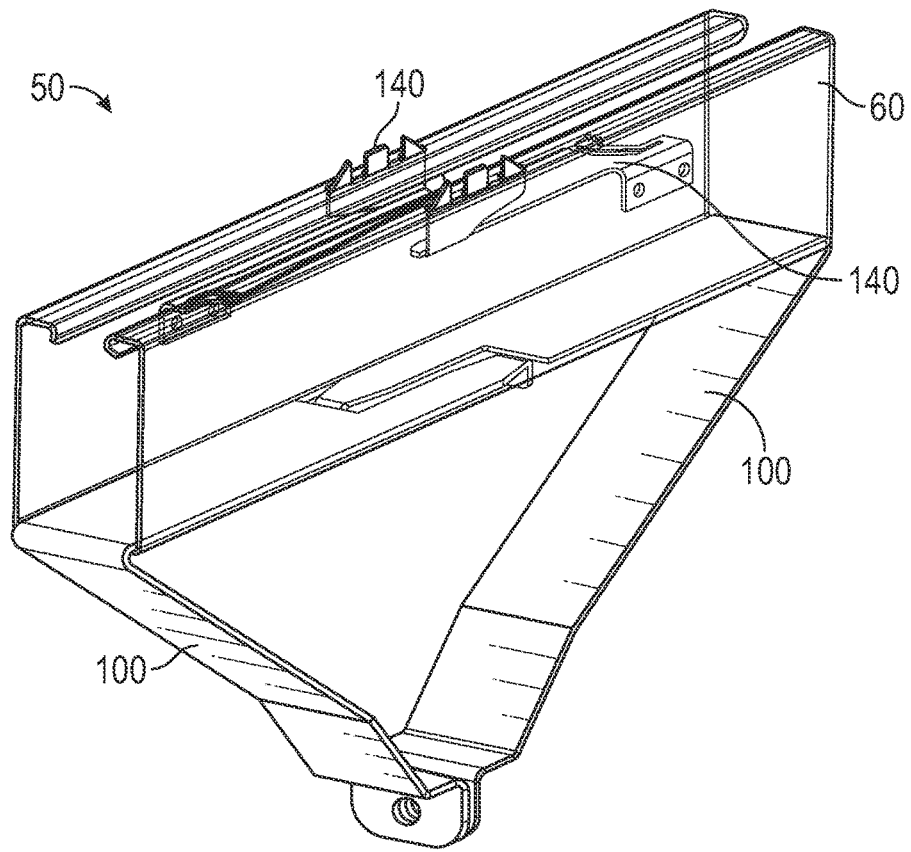
FIG. 2 is a partially transparent detailed perspective view of a rail assembly of the mounting assembly of FIG. 1, according to an exemplary embodiment.
Figure 3:
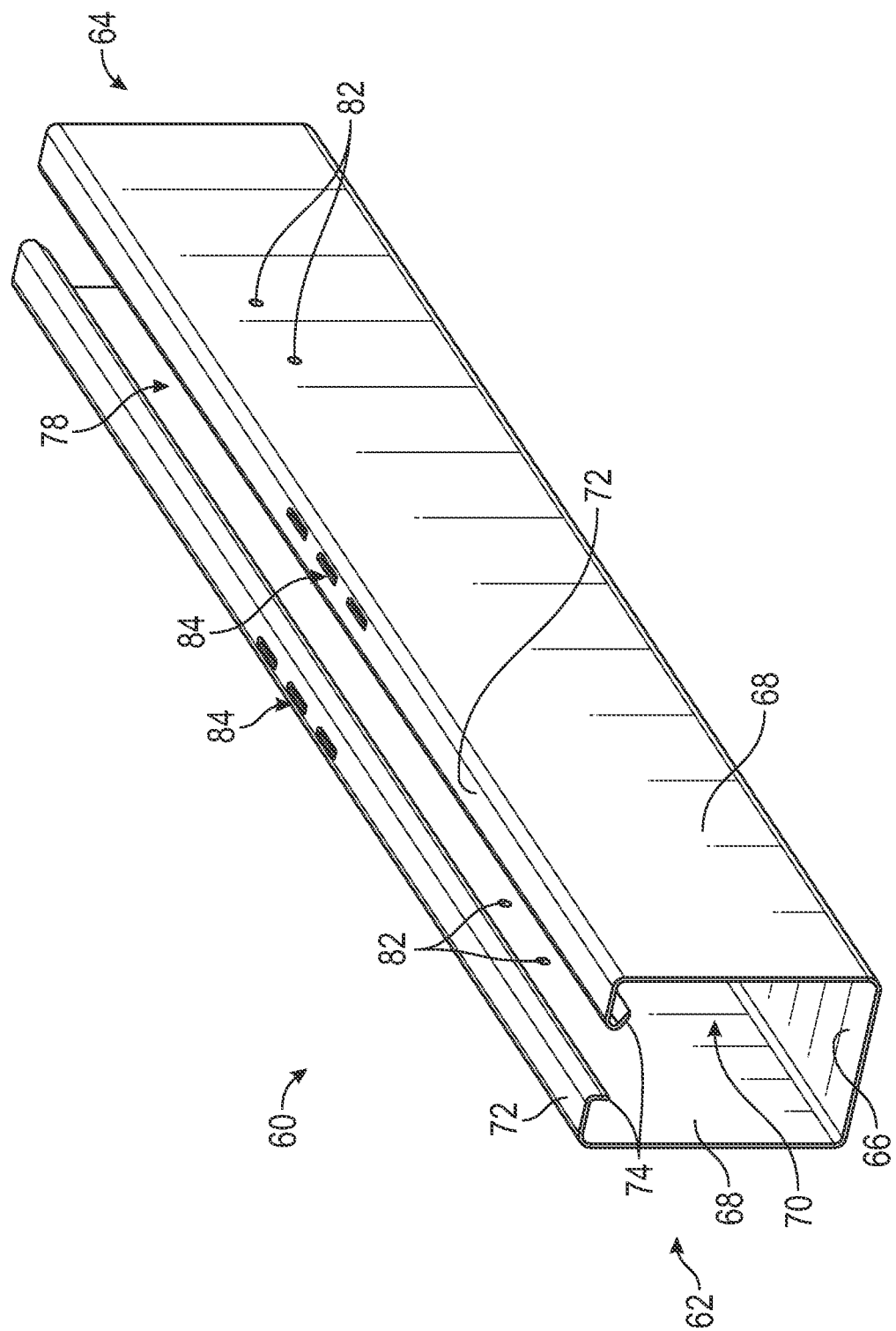
FIG. 3 is a detailed view of a rail of the rail assembly of FIG. 2, according to an exemplary embodiment.
Figure 4:
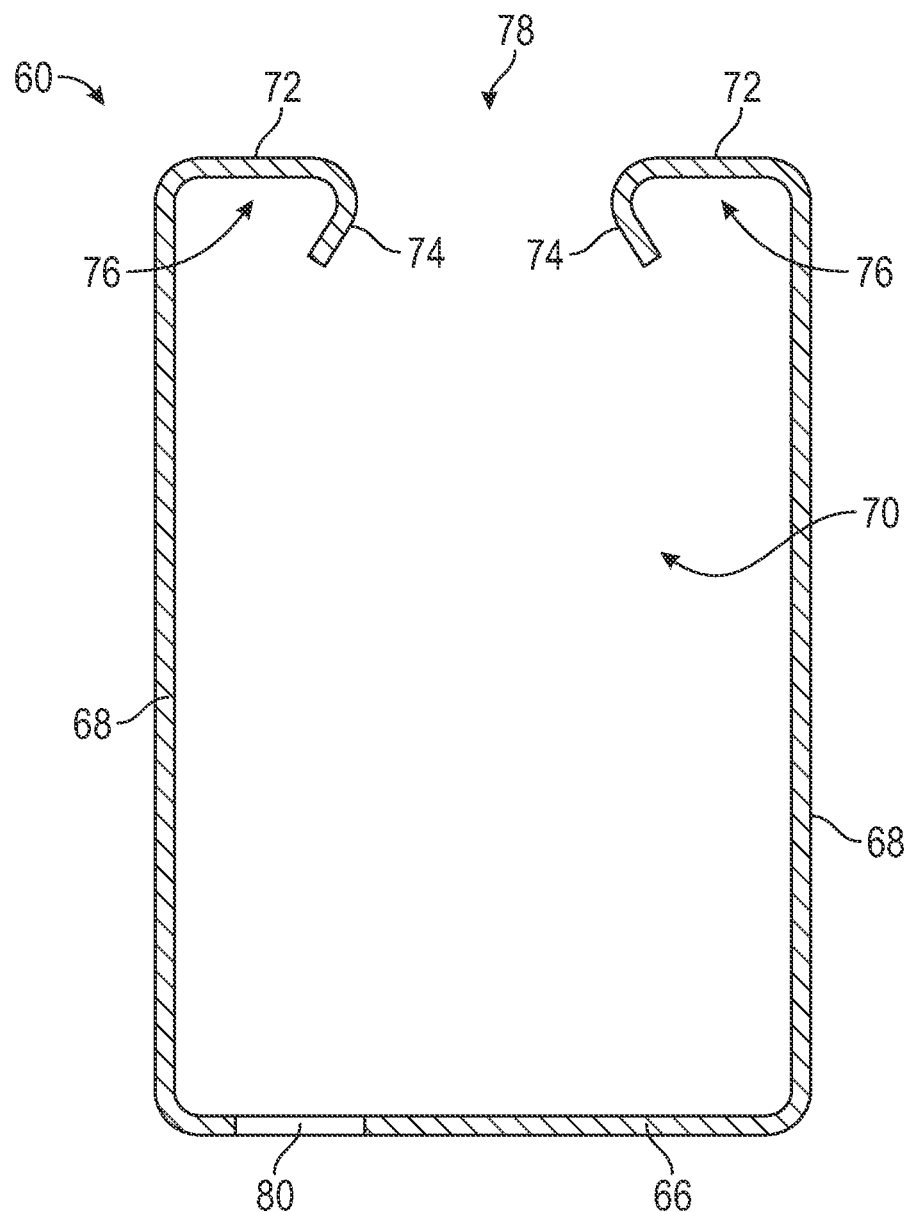
FIG. 4 is a cross-sectional view of the rail of FIG. 3, according to an exemplary embodiment.

As shown in FIG. 2, each rail assembly 50 includes a rail, shown as mounting rail 60, a pair of coupling members, shown as tube clamps 100, and a pair of locking members, shown as grounding locks 140 (e.g., to facilitate coupling two separate solar modules 200 to the torque tube 30). In other embodiments, each rail assembly 50 only includes one grounding lock 140 (e.g., to facilitate couple a single solar module 200 to the torque tube 30). As shown in FIG. 3, the mounting rail 60 has a first end, shown as end 62, and an opposing second end, shown as end 64. As shown in FIGS. 3 and 4, the mounting rail 60 has an outer wall including a first plate, shown as bottom wall 66, and a pair of side plates, shown as sidewalls 68, extending along opposing edges of and upward from the bottom wall 66. The bottom wall 66 and the sidewalls 68 cooperatively define an interior chamber, shown as internal volume 70. According to the exemplary embodiment shown in FIGS. 3 and 4, the bottom wall 66 and the sidewalls 68 of the outer wall define a generally U-shaped profile for the mounting rail 60. In other embodiments, the outer wall of the mounting rail 60 has a different shape (e.g., pentagon-shaped, hexagon-shaped, octagon-shaped, trapezoidal-shaped, etc.).

As shown in FIGS. 3 and 4, the ends of the sidewalls 68 opposite the bottom wall 66 terminate with a rim, shown as lip 72. The lips 72 extend or protrude inward toward each other and terminate with curved flanges, shown as securing flanges 74, that curl downward into the internal volume 70 and back toward the sidewalls 68. As shown in FIG. 4, the sidewalls 68, the lips 72, and the securing flanges 74 cooperatively define a pair of channels, shown as channels 76, within the internal volume 70. As shown in FIGS. 3 and 4, the lips 72 are spaced a distance apart such that a longitudinal opening, shown as slit 78, is defined therebetween that provides access to the internal volume 70 of the mounting rail 60.

Figure 6:
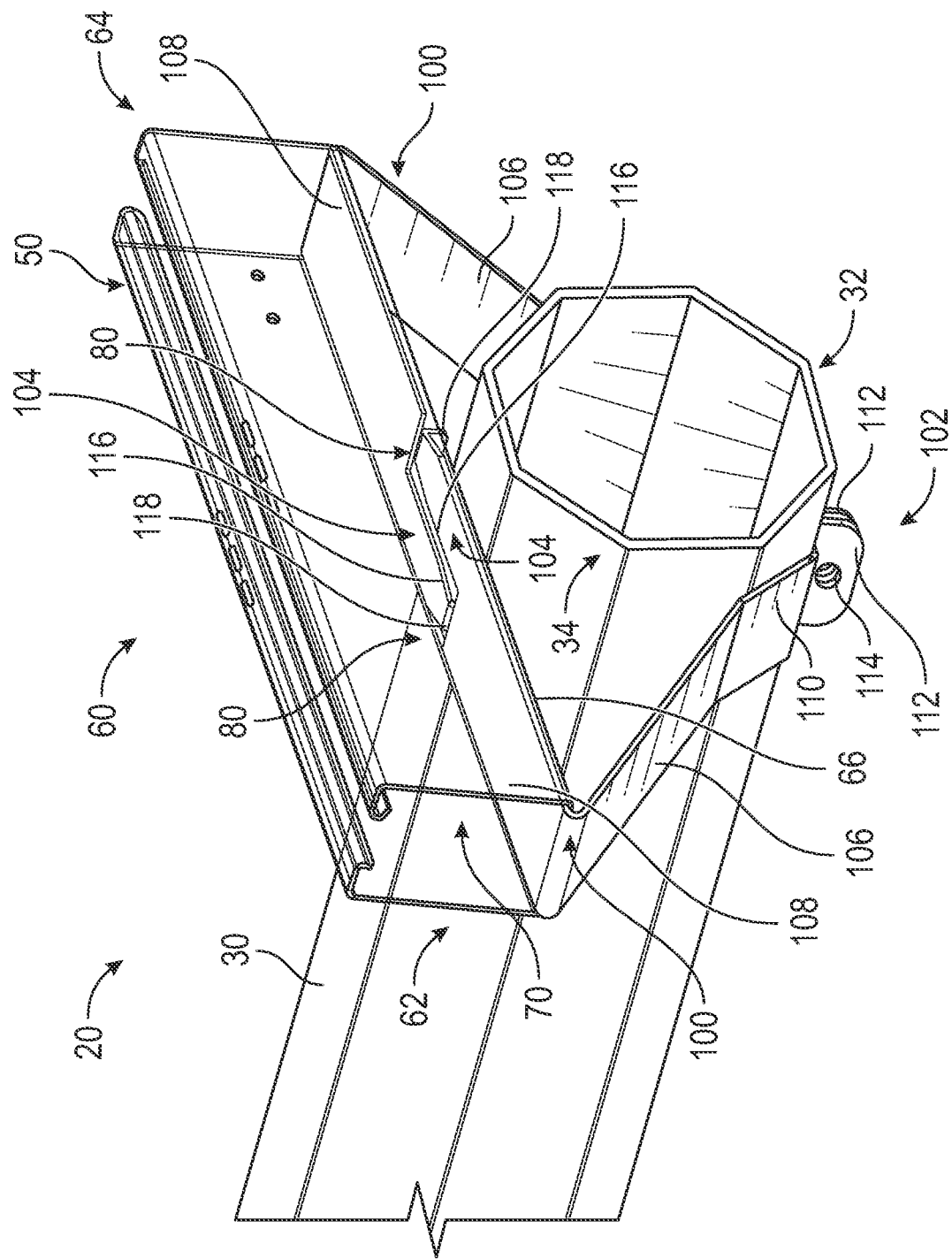
FIG. 6 is a partially transparent detailed perspective view of the tube clamps of FIG. 5 coupling the rail of FIGS. 3 and 4 to the support of FIG. 1, according to an exemplary embodiment.

As shown in FIGS. 4 and 6, the bottom wall 66 of the mounting rail 60 defines a plurality of apertures, shown as retaining slots 80. A first retaining slot 80 is positioned proximate a first one of the sidewalls 68 and closer to the end 62 of the mounting rail 60. A second retaining slot 80 is positioned proximate a second one of the sidewalls 68 and closer to the end 64 of the mounting rail 60. As shown in FIG. 3, the sidewalls 68 including a plurality of mounting interface that define a plurality of mounting apertures, shown as mounting holes 82. A first mounting interface including a first set of the mounting holes 82 is positioned along a first one of the sidewalls 68 proximate the end 62 of the mounting rail 60. A second mounting interface including a second set of the mounting holes 82 is positioned along a second one of the sidewalls 68 proximate the end 64 of the mounting rail 60. As shown in FIG. 3, each of the lips 72 includes a locking interface that defines a plurality of locking apertures, shown as tab holes 84, arranged in series along the lips 72 at or proximate a center portion of the mounting rail 60. While shown as defining three tab holes 84, in other embodiments, the lips 72 define a different number of tab holes 84 (e.g., one, two, four, etc.).

Figure 5:
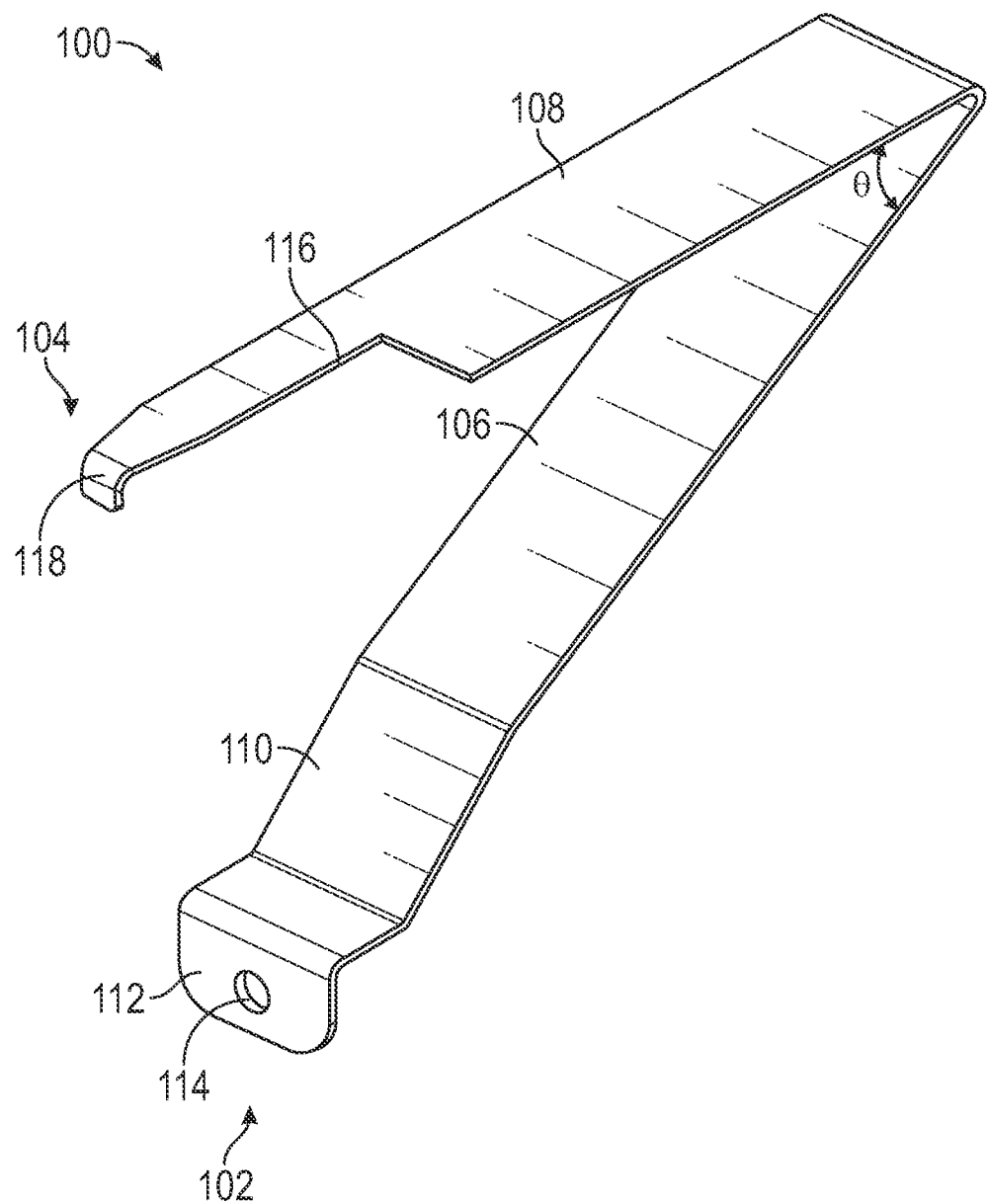
FIG. 5 is a detailed perspective view of a tube clamp of the rail assembly of FIG. 2, according to an exemplary embodiment.

As shown in FIG. 5, the tube clamp 100 includes a first end, shown as lower end 102, a second end, shown as upper end 104, a first portion, shown as lower arm 106, extending from the lower end 102, and a second portion, shown as upper arm 108, extending from the lower arm 106 to the upper end 104. According to the exemplary embodiment shown in FIG. 5, the upper arm 108 extends horizontal or substantially horizontal and the lower arm 106 extends downward from the upper arm 108 at an acute angle θ (e.g., less than 90 degrees such as 30 degrees, 45 degrees, 60 degrees, etc.) such that the lower end 102 and the upper end 104 extend in the generally the same direction.

As shown in FIG. 5, the lower arm 106 defines a first interface, shown as tube interface 110, and terminates with a flange, shown a clamp flange 112, positioned at the lower end 102. The clamp flange 112 defines an aperture, shown as coupling hole 114. The upper arm 108 defines a cutout, shown as notch 116, positioned at the upper end 104 such that the upper arm 108 is narrower or thinner at the upper end 104 than at the opposite end of the upper arm 108 connected to the lower arm 106. The upper arm 108 terminates with a retainer, shown retaining tab 118, that extends downward from the upper end 104 of the upper arm 108.

As shown in FIG. 6, two of the tube clamps 100 are configured to cooperatively couple one of the mounting rails 60 to the torque tube 30. The upper ends 104 of tube clamps 100 interface with the mounting rail 60 to hold or secure an exterior surface of the bottom wall 66 against an upper portion 34 of the torque tube 30 while the lower arms 106 clamp onto a lower portion 32 of the torque tube 30 to couple or secure the rail assembly 50 to the torque tube 30. As shown in FIG. 6, the tube interfaces 110 of the lower arms 106 of the tube clamps 100 are shaped (e.g., bent, angled, etc.) to accommodate (e.g., interface with, engage with, receive, etc.) the lower portion 32 of the torque tube 30. The lower ends 102 of the tube clamps 100 align such that the clamp flanges 112 can be secured together using a fastener (e.g., a bolt and nut, a rivet, etc.) that extends though the coupling holes 114 of the clamp flanges 112. The upper arms 108 extend into the internal volume 70 of the mounting rail 60 through the opposing ends (i.e., the end 62 and the end 64) of the mounting rail 60 and extend along an interior surface of the bottom wall 66 of the mounting rail 60. The notches 116 of the upper arms 108 interface with each other such that the upper ends 104 of the upper arms 108 extend past each other and each of the retaining tabs 118 extends into a respective retaining slot 80 defined by the bottom wall 66 of the mounting rail 60. In other embodiments, the upper arms 108 do not define the notches 116 such that the upper ends 104 do not extend past each other (see, e.g., FIGS. 13, 14, and 16).

Figure 7:
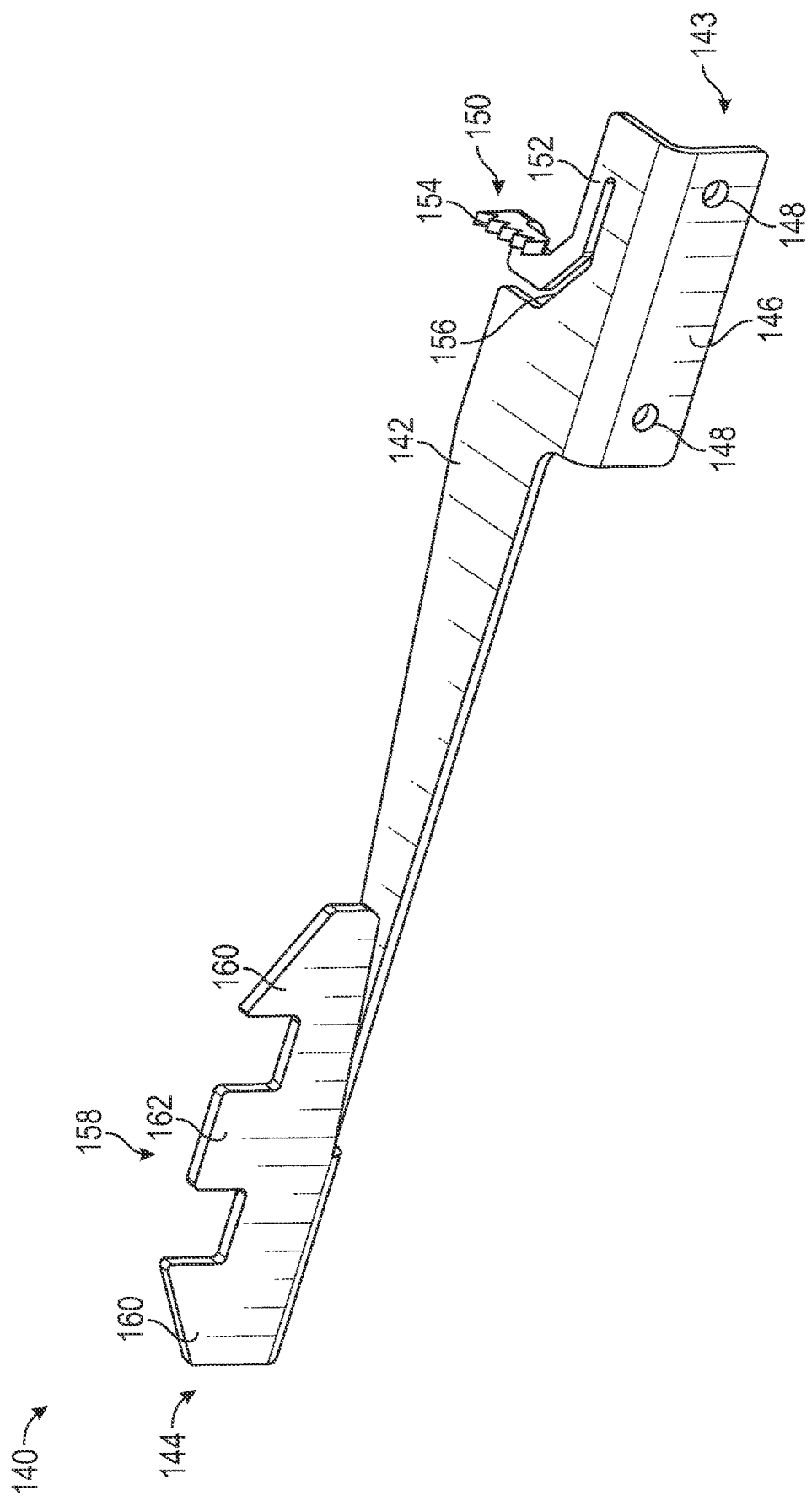
FIG. 7 is a detailed perspective view of a grounding lock of the rail assembly of FIG. 2, according to an exemplary embodiment.

As shown in FIG. 7, the grounding lock 140 includes a main body portion, shown as locking spring arm 142, having a first end, shown as mounting end 143, and an opposing second end, shown as locking end 144. The grounding lock 140 includes a mounting interface, shown as mounting flange 146, and a grounding element or interface, shown as grounding spring 150, positioned at the mounting end 143 of the locking spring arm 142. The mounting flange 146 extends perpendicularly downward from the mounting end 143 of the locking spring arm 142. The mounting flange 146 includes a mounting interface defining a plurality of apertures, shown as mounting holes 148.

As shown in FIG. 7, the grounding spring 150 includes a biasing element, shown as grounding spring arm 152, and an electrical grounding interface, shown as grounding contact 154. The grounding spring arm 152 is defined by and substantially separated from the remainder of the mounting end 143 of the locking spring arm 142 by a cutout, shown as grounding cutout 156, such that the grounding spring arm 152 is a cantilevered arm. The grounding contact 154 is positioned at the free end of the grounding spring arm 152. According to the exemplary embodiment shown in FIG. 7, the grounding contact 154 has a plurality of pointed teeth.

As shown in FIG. 7, the grounding lock 140 includes a locking interface, shown as locking flange 158, positioned at the locking end 144 of the locking spring arm 142. The locking flange 158 extends perpendicularly upward from the locking end 144 of the locking spring arm 142. The locking flange 158 includes a locking interface defining a plurality of tabs, shown as outer tabs 160 and inner tab 162. According to the exemplary embodiment shown in FIG. 7, the outer tabs 160 have an angled or tapered profile. As shown in FIG. 7, the locking flange 158 includes two outer tabs 160 and a single inner tab 162. In other embodiments, the locking flange 158 includes a plurality of inner tabs 162. In still other embodiment, the locking flange 158 does not include the inner tab 162.

Figure 8:
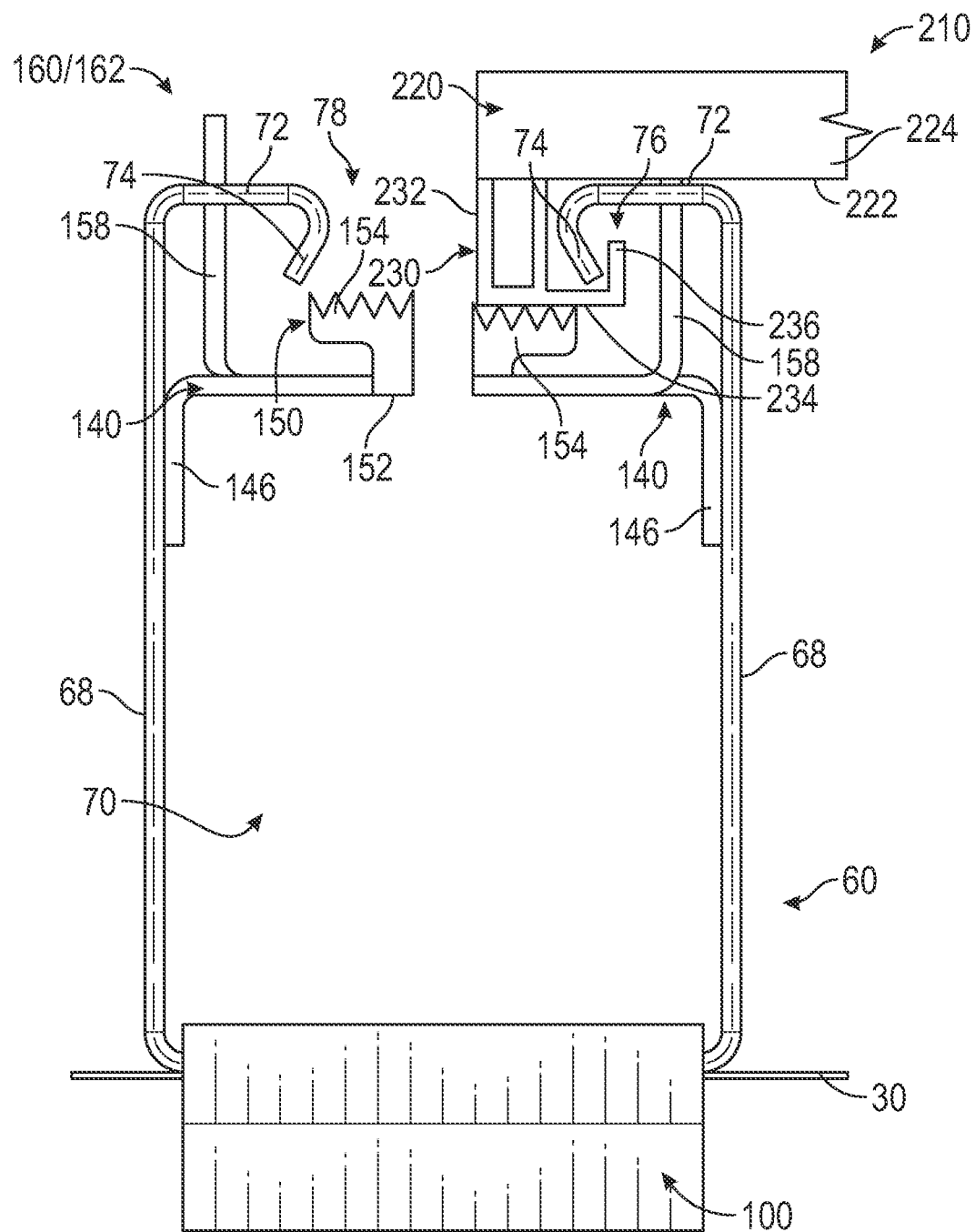
FIG. 8 is a detailed end view of the frame assembly of the solar module of FIG. 1 coupled to the rail assembly of FIG. 2, according to an exemplary embodiment.

As shown in FIG. 8, the grounding locks 140 are positioned within the internal volume 70 of the mounting rail 60. Each respective grounding lock 140 is coupled to an interior surface of one of the sidewalls 68 of the mounting rail 60. Specifically, the mounting flange 146 of each of the grounding locks 140 is coupled to the inner surface of one of the sidewalls 68 by aligning the mounting holes 148 of the mounting flange 146 with the mounting holes 82 of the sidewall 68 and using fasteners (e.g., bolts, rivets, etc.) to secure the mounting flange 146 and, thereby, the grounding lock 140 to the sidewall 68 of the mounting rail 60. In other embodiments, the mounting flange 146 is otherwise coupled (e.g., welded, adhesively secured, clamped, clipped, etc.) to the interior surface of the sidewall 68. In some embodiments, the locking spring arm 142 of the grounding locks 140 is rigid (i.e., does not function like a spring or flex as described herein). In such embodiments, the mounting flange 146 may be resiliently mounted to the sidewall 68 of the mounting rail 60 such that the grounding lock 140 pivots about its coupling to the sidewall 68 when the locking flange 158 is engaged by the solar module 200, as described in greater detail herein.

As shown in FIG. 8, the locking flange 158 of each grounding lock 140 extends perpendicularly upward from the locking end 144 of the locking spring arm 142 such that the outer tabs 160 and the inner tab 162 (i) protrude into the channel 76 defined by the sidewall 68, the lips 72, and the securing flange 74 of the mounting rail 60 and (ii) through the tab holes 84 defined in the lip 72 associated therewith. The locking end 144 of the locking spring arm 142 is, therefore, a free end such that the locking spring arm 142 is a cantilevered arm. As shown in FIG. 2, the grounding locks 140 are coupled to the mounting rail 60 proximate or towards opposing ends of the mounting rail 60 and extend toward each other. In other embodiments, the grounding locks 140 are coupled to the mounting rail 60 proximate or towards the same end of the mounting rail 60 and extend in the same direction (see, e.g., FIG. 13).

Figure 9:
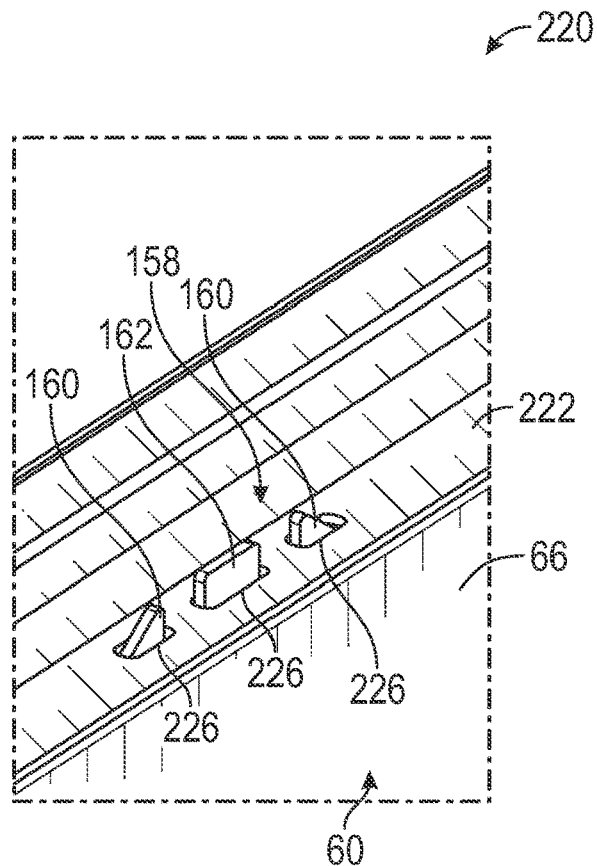
FIG. 9 is a detailed perspective view of the grounding lock of FIG. 7 engaging with the frame assembly of the solar module of FIG. 1, according to an exemplary embodiment.

As shown in FIGS. 8 and 9, the frame assembly 210 of the solar module 200 includes a first frame portion, shown as module frame 220. The module frame 220 has a base, shown as frame base 222, and a peripheral sidewall, shown as frame sidewall 224, extending around a periphery of the frame base 222. The frame base 222 of the module frame 220 includes a locking interface that defines a plurality of apertures, shown as tab holes 226, arranged in series along opposing edges of the module frame 220 (e.g., along opposing lateral edges, along opposing longitudinal edges, etc.).

As shown in FIG. 8, the frame assembly 210 of the solar module 200 includes a second frame portion (e.g., an interface, a channel, a flange, an extension, a protrusion, etc.), shown as frame capture 230, that extends along opposing edges of the module frame 220 (e.g., along opposing lateral edges, along opposing longitudinal edges, etc.). The frame capture 230 has a first portion, shown as drop 232, that extends downward from the frame base 222; a second portion, shown as contact rail 234, extending inward from the drop 232 toward the center of the solar module 200; and a third portion, shown as catch 236, that extends upward from the free end of the contact rail 234, opposite the drop 232.

As shown in FIGS. 8 and 9, when the frame assembly 210 of the solar module 200 is coupled to the rail assembly 50, (i) the frame base 222 rests along the lip 72, (ii) the drop 232 of the frame capture 230 extends through the slit 78 defined between the lips 72 of the mounting rail 60, (iii) the contact rail 234 of the frame capture 230 engages with the teeth of the grounding contact 154 of the grounding spring 150 of the grounding lock 140, (iv) the catch 236 of the frame capture 230 extends into the channel 76 and interfaces with the securing flange 74 of the lip 72 such that the securing flange 74 is surrounded by the drop 232, the contact rail 234, and the catch 236 of the frame capture 230, and (v) the tab holes 226 of the frame base 222 align with the tab holes 84 of the lip 72 of the mounting rail 60 such that the outer tabs 160 and the inner tab 162 of the locking flange 158 of the grounding lock 140 protrude through tab holes 84 and the tab holes 226.

According to an exemplary embodiment, the solar module 200 is installed onto the racking assembly 20 as follows. First, the mounting assembly 40 is installed onto the torque tube 30 by coupling two rail assemblies 50 to the torque tube 30 at a select distance apart to accommodate the solar module 200 (i.e., based on the width of the solar module 200). Second, the frame captures 230 extending from opposing sides of the module frame 220 of the frame assembly 210 are inserted into the internal volume 70 and the slit 78 through one of the end 62 or the end 64 of each of the mounting rails 60 of the mounting assembly 40 such that the catch 236 slides into the channel 76 and engages with the securing flange 74. Third, the solar module 200 is slid (e.g., pushed, pulled, etc.) along the lips 72 of the mounting rails 60 of the mounting assembly 40 until the frame assembly 210 of the solar module 200 engages with the grounding locks 140 of the rail assemblies 50 to lock and hold the solar module 200 in place, as well as ground the solar module 200, all while using no tools or fasteners (i.e., the mounting assembly 40 and the solar module 200 have a fastener-less coupling). The interaction between the grounding locks 140 of the mounting assembly 40 and the frame assembly 210 of the solar module 200 will be described in greater detail herein, specifically, (i) the locking interaction between the grounding locks 140 and the frame assembly 210 and (ii) the grounding interaction between the grounding locks 140 and the frame assembly 210.

As the frame assembly 210 is slid along the mounting rails 60, the leading edge of the frame sidewall 224 of the module frame 220 interacts with the tapered profile of one of the outer tabs 160 (depending on which end of the mounting rails 60 that the solar module 200 is installed from) of the locking flange 158 of each of the grounding locks 140 that is protruding through the tab holes 84 of the lips 72 of the mounting rails 60. The force of the frame sidewall 224 of the module frame 220 against the tapered profile of the outer tabs 160 causes the locking spring arms 142 to flex or bend (or pivot if resiliently mounted to the mounting rails 60) such that the outer tabs 160 and the inner tab 162 of the locking flanges 158 recess into the tabs holes 84 of the mounting rails 60 of the mounting assembly 40 and the frame assembly 210 can continue to slide along the mounting rails 60. Then, when the tab holes 226 defined by the frame base 222 of the module frame 220 align with the tab holes 84 defined by the lips 72 of the mounting rails 60, the locking spring arms 142 flex back and bias the locking flanges 158 back to their original position such that the outer tabs 160 and the inner tab 162 of the locking flanges 158 protrude through both the tab holes 84 of the mounting rails 60 and the tab holes 226 of the frame base 222 of the module frame 220. The combination of the locking flanges 158 and the frame captures 230, therefore, secure and lock the solar module 200 to the mounting assembly 40. Specifically, (i) the interaction between the locking flanges 158 and the module frame 220 prevent the solar module 200 from sliding along the mounting rails 60 of the mounting assembly 40 and (ii) the interaction between the catches 236 of the frame captures 230 and the securing flanges 74 of the lips 72 of the mounting rails 60 prevent the solar module 200 from being lifted off the mounting rails 60 of the mounting assembly 40.

In addition, as the frame assembly 210 is slid along the mounting rails 60, the contact rails 234 of the frame captures 230 engage with the grounding contacts 154 of the grounding springs 150 of the grounding locks 140. Specifically, the grounding spring arms 152 flex or bend when the contact rails 234 engage with the teeth of the grounding contacts 154 and then bias or force the teeth of the grounding contacts 154 into the surface of the contact rail 234. Such biased contact causes the teeth of the grounding contacts 154 to cut through any coatings, corrosion, or anodization along the surface of the contact rail 234 to provide sufficient contact between the grounding contacts 154 and the underlying material of the contact rails 234 to facilitate electrically grounding the solar module 200.

Figure 10:
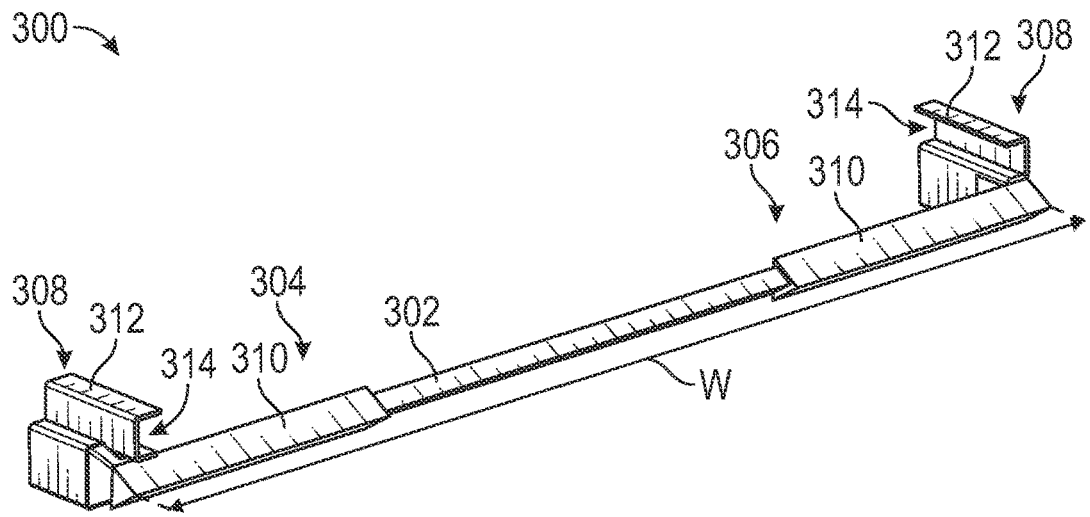
FIG. 10 is a perspective view of an installation tool used for assembling the solar racking system of FIG. 1, according to an exemplary embodiment.
Figure 11:
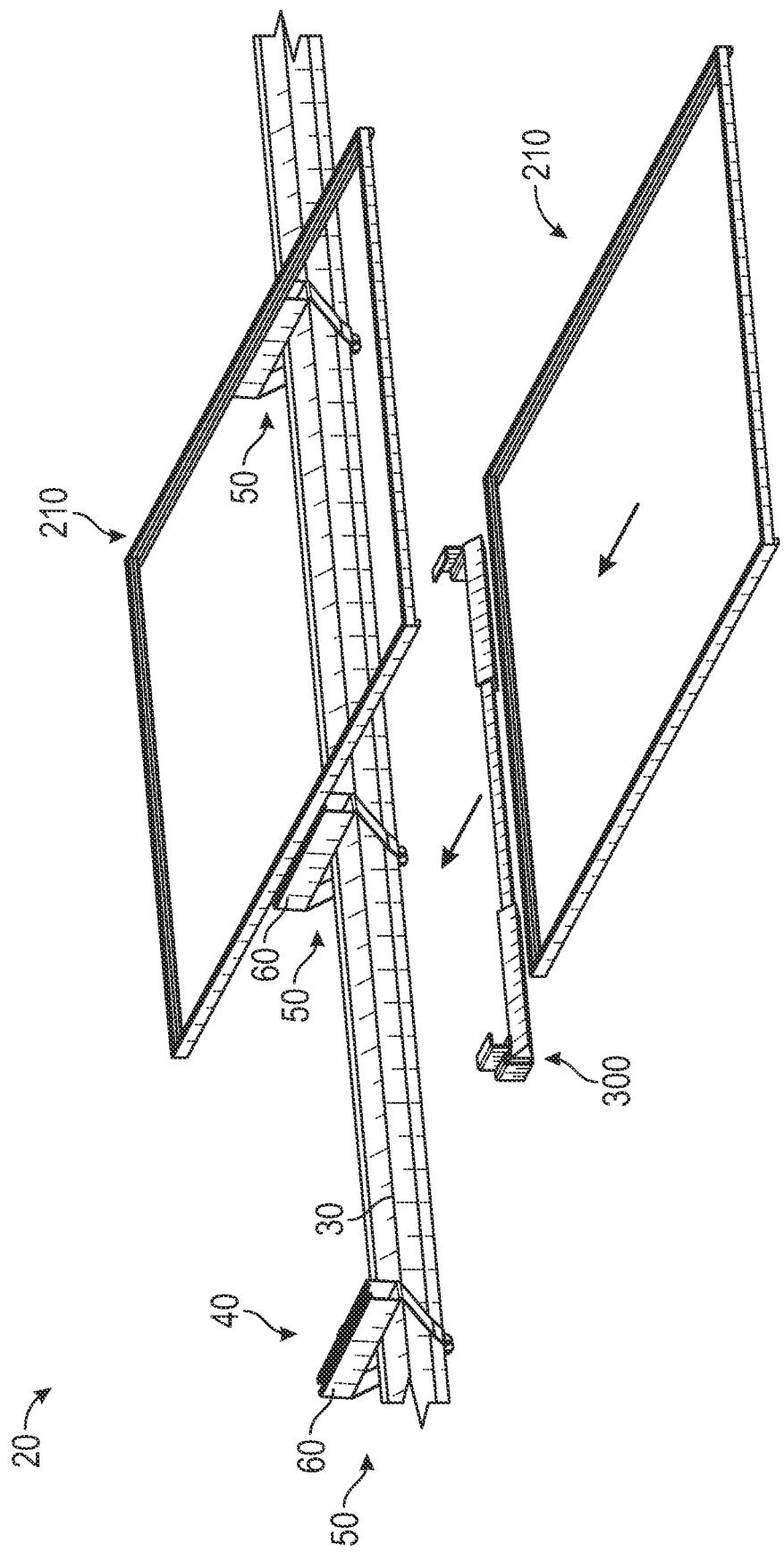
FIGS. 11 and 12 show a process of using the installation tool of FIG. 10 to assemble the solar racking system of FIG. 1, according to an exemplary embodiment.
Figure 12:
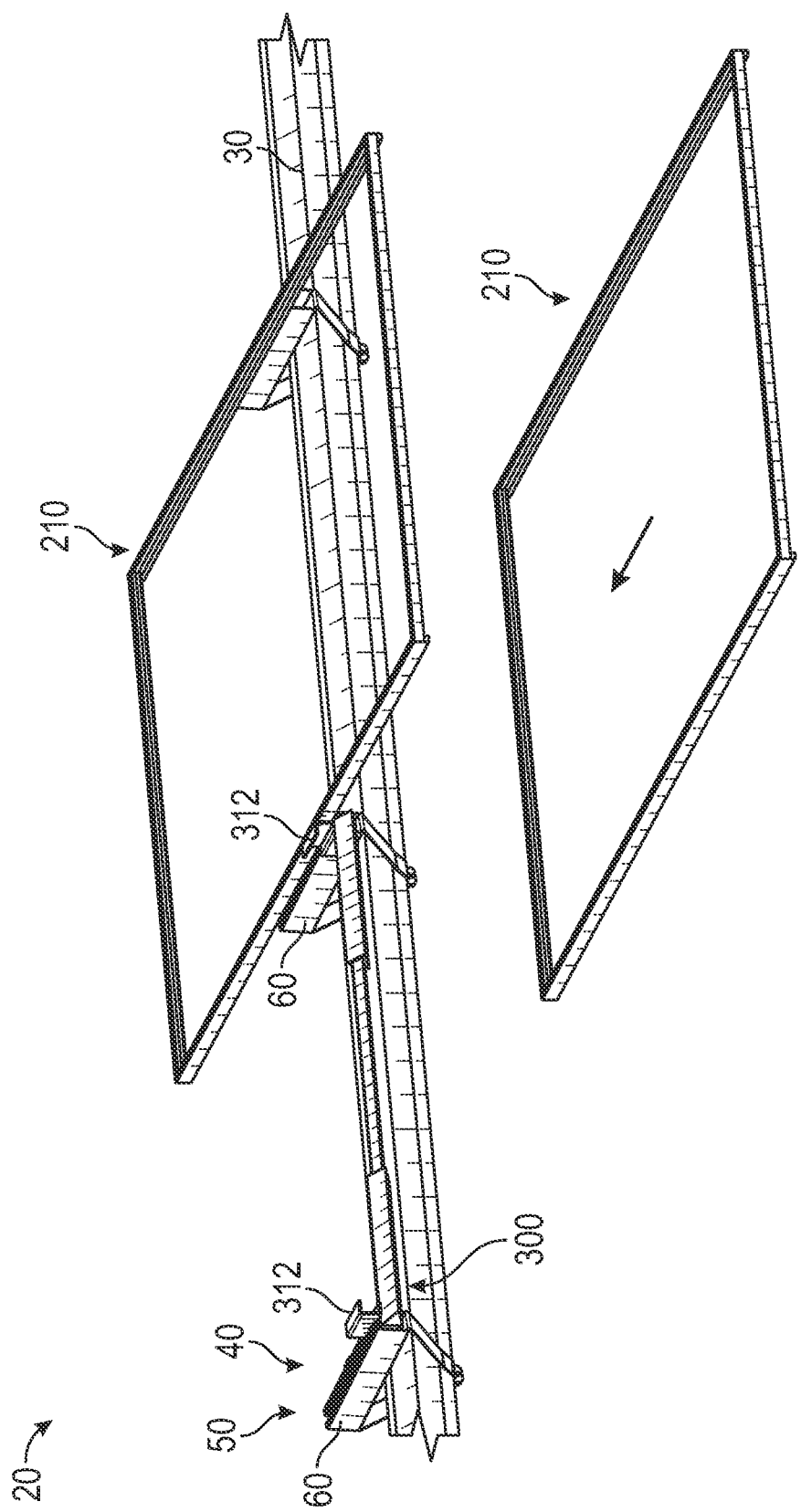

As shown in FIGS. 10-12, a spacing and installation tool, shown as module installation tool 300, can be used by an installer to facilitate properly spacing the rails assemblies 50 of the mounting assemblies 40 along the torque tube 30 to accommodate the solar modules 200 and guiding the solar modules 200 into engagement with the mounting assemblies 40. As shown in FIG. 10, the module installation tool 300 includes a lateral member, shown as crossbar 302, having a first end, shown as left end 304, and an opposing second end, shown as right end 306. The module installation tool 300 includes a pair of end assemblies, shown as guide assemblies 308, with one of the guide assemblies 308 coupled to each of the left end 304 and the right end 306 of the crossbar 302. Each of the guide assemblies 308 includes a housing, shown as coupling receiver 310, that receives and/or couples to the crossbar 302. In some embodiments, the coupling receivers 310 are repositionable (e.g., slidable, translatable, etc.) along the crossbar 302 (e.g., the ends of the crossbar 302 can selectively extend or retract within the coupling receivers 310, etc.) to facilitate adjusting the width w of the module installation tool 300 to accommodate different width solar modules 200. In other embodiments, the width w of the module installation tool 300 is fixed. In such embodiments, multiple module installation tools 300 may be manufactured to accommodate different width solar modules 200. As shown in FIG. 10, each of the guide assemblies 308 further includes a guide, shown as guide rail 312, coupled to a free end of the coupling receiver 310 opposite the end that receives or is coupled to the crossbar 302. Each of the guide rails 312 defines a slot, shown as frame channel 314. The frame channels 314 are configured (e.g., shaped, sized, structured, etc.) to receive and guide the frame assembly 210 of the solar module 200.

As shown in FIG. 11, the module installation tool 300 can be resized to correspond with the width of the frame assembly 210 of the solar module 200 or a proper sized module installation tool 300 can be selected based on the width of the frame assembly 210 of the solar module 200. As shown in FIG. 12, the guide rails 312 of the module installation tool 300 can then be inserted into the slits 78 and the internal volumes 70 of the mounting rails 60 of the rail assemblies 50 of the mounting assembly 40 to space the rail assemblies 50 a distance apart along the torque tube 30 that will accommodate the frame assembly 210 of the solar module 200. Once the rail assemblies 50 are properly spaced, the tube clamps 100 can be tightened to secure the rail assemblies 50 in the proper position. Then, the frame assembly 210 can be inserted into the frame channels 314 of the guide rails 312 to facilitate locking and grounding the frame assembly 210 to the rail assemblies 50 as described herein. According to an exemplary embodiment, the mounting assemblies 40 and the module installation tool 300 reduce labor time and expense, reduce the use of traditional fastening hardware, eliminate the need for expensive tools or equipment, improve installation quality, and provide an easily repeatable installation process relative to typical solar mounting techniques that use traditional fastening hardware. While installation of the solar module 200 with the racking assembly 20 is disclosed herein as being performed with the module installation tool 300, it should be understood that installation could be performed without use of the module installation tool 300.

Figure 13:
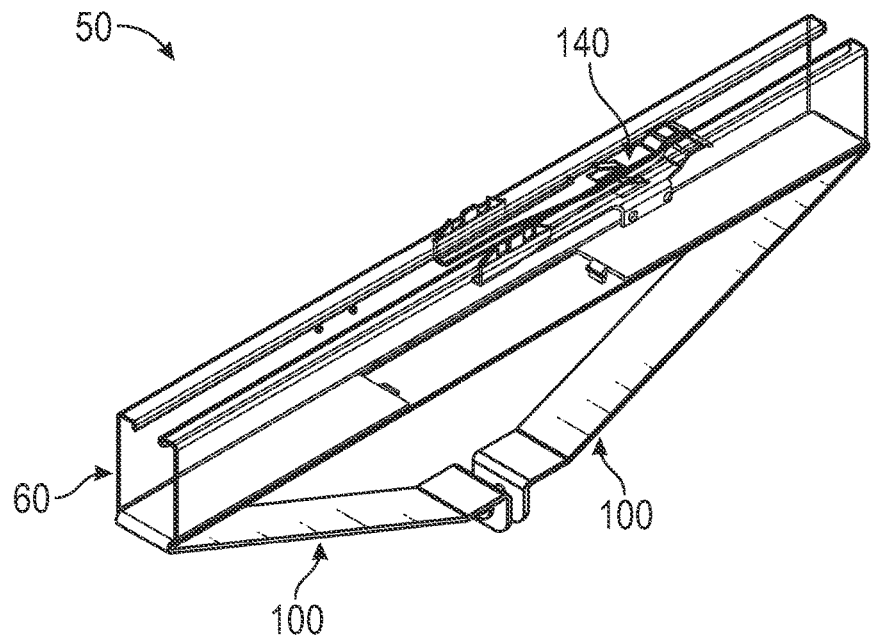
FIG. 13 is a partially transparent detailed perspective view of a rail assembly of the mounting assembly of FIG. 1, according to another exemplary embodiment.
Figure 14:
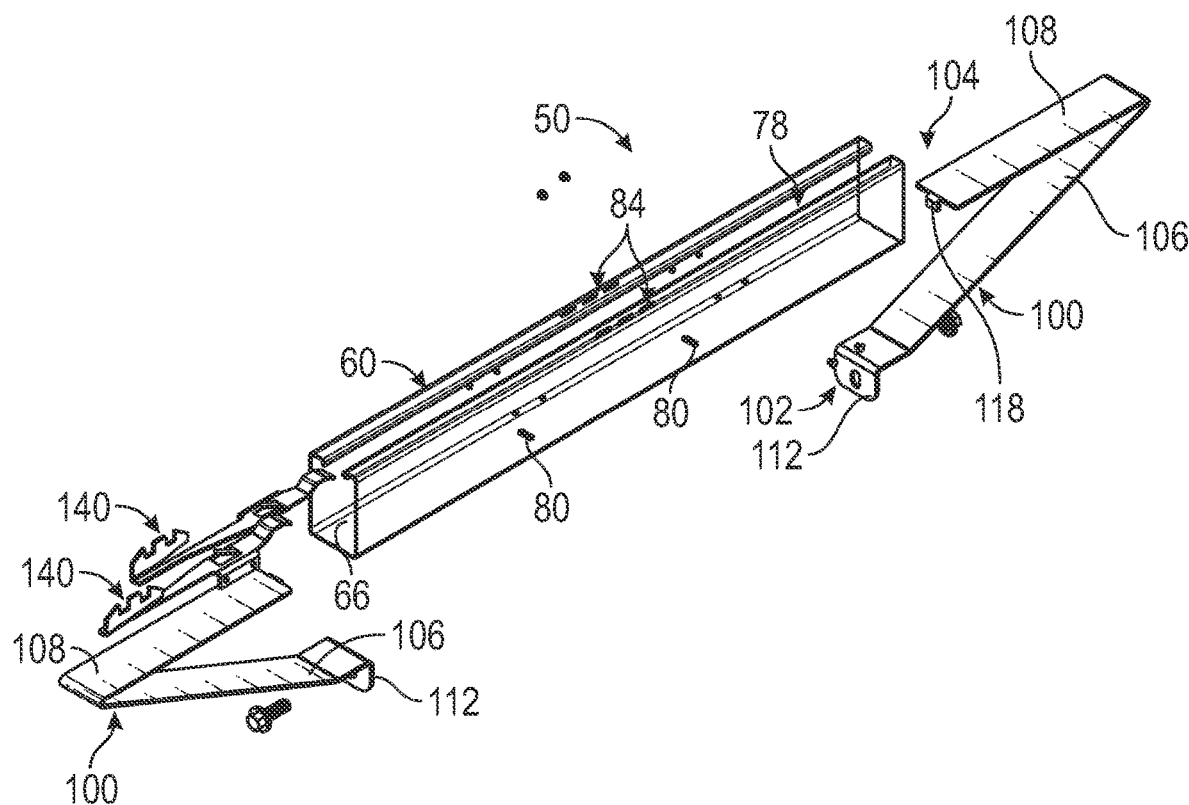
FIG. 14 is a partially transparent exploded view of the rail assembly of FIG. 13, according to an exemplary embodiment.
Figure 16:
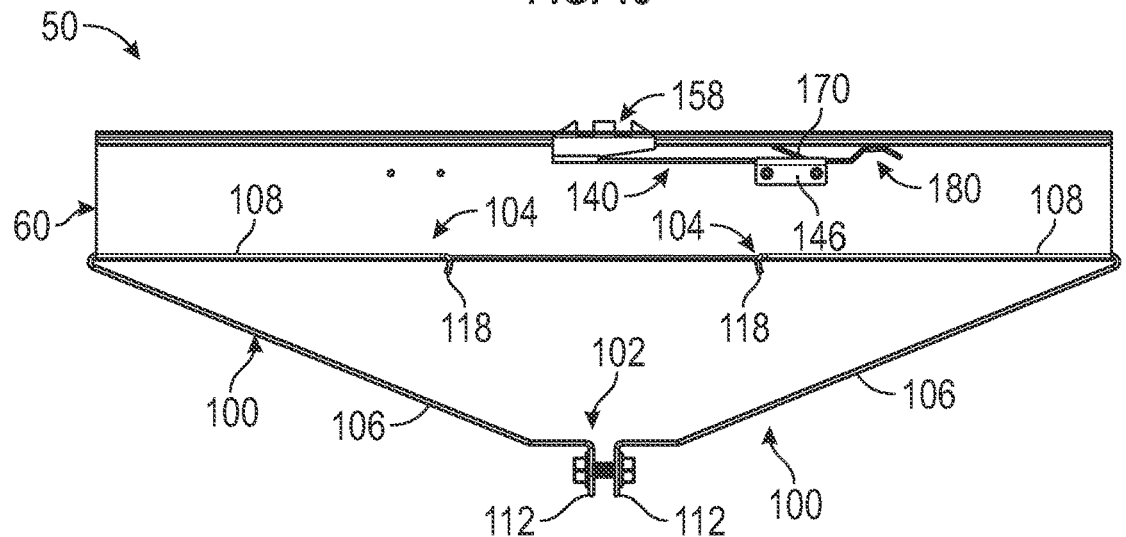
FIG. 16 is a partially-transparent side view of the rail assembly of FIG. 13, according to an exemplary embodiment.
Figure 17:
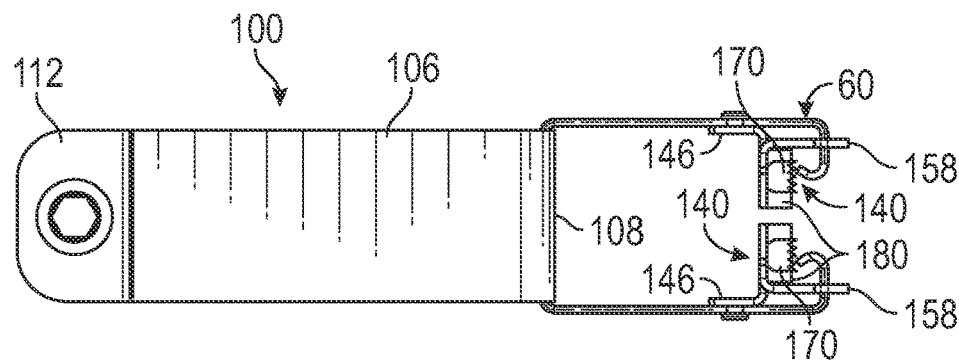
FIG. 17 is a detailed cross-sectional view of the rail assembly of FIG. 13, according to an exemplary embodiment.

As shown in FIGS. 13, 14, 16, and 17, the structure of the tube clamps 100 is slightly varied from the tube clamps 100 shown in FIGS. 2, 5, 6, and 8. Specifically, as shown in FIGS. 13, 14, 16, and 17, the tube clamps 100 do not include the tube interface 110 or the notch 116. Rather, the lower arm 106 of the tube clamps 100 is substantially straight and the upper end 104 of the upper arm 108 simply terminates with the retaining tab 118. Therefore, as shown in FIGS. 13 and 16, the upper ends 104 of the upper arms 108 of the tube clamps 100 do not extend past each other, but instead are spaced from one another.

As shown in FIGS. 13-17, the structure of the grounding locks 140 is slightly varied from the grounding locks 140 shown in FIGS. 2, 7, and 8. Specifically, as shown in FIGS. 13-17, (i) the grounding locks 140 are coupled to the mounting rail 60 proximate or towards the same end of the mounting rail 60 and extend in the same direction, (ii) the grounding locks 140 do not include the grounding spring 150 or define the grounding cutout 156, but rather the grounding locks 140 include a different grounding element or interface, shown as grounding spring 170, positioned at the mounting end 143 of the locking spring arm 142 and the locking spring arm 142 of the grounding locks 140 defines an aperture, shown as grounding aperture 176, and (iii) the grounding locks 140 additionally include a guide element, shown as guide 180, extending rearward from the mounting end 143 of the grounding locks 140.

Figure 15:
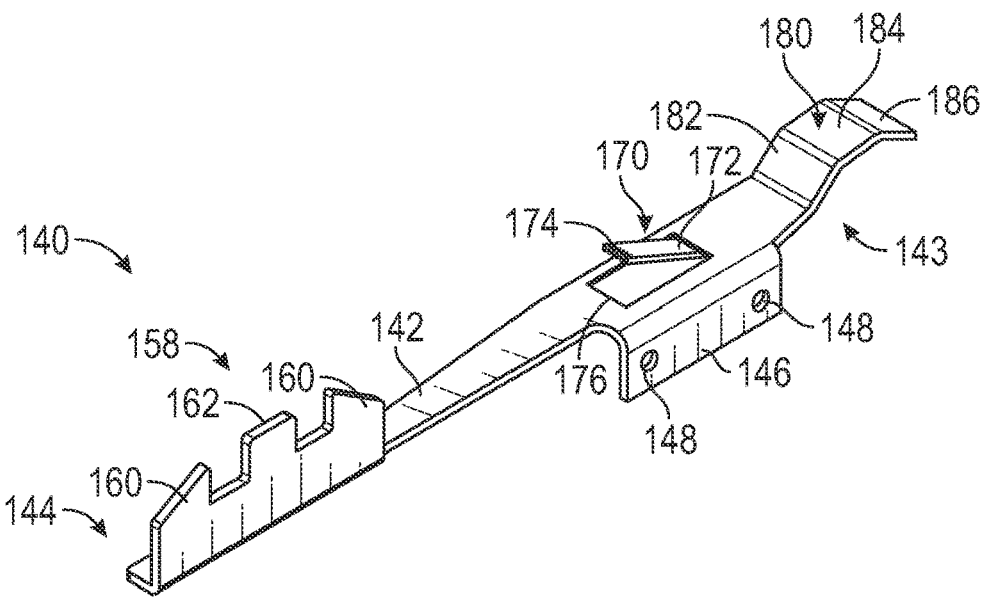
FIG. 15 is a detailed perspective view of a grounding lock of the rail assembly of FIG. 13, according to an exemplary embodiment.

As shown in FIG. 15, the grounding spring 170 includes a biasing element, shown as grounding spring ramp 172, and an electrical grounding interface, shown as grounding contact 174. The grounding spring arm 152 extends from and is substantially separated from the remainder of the mounting end 143 of the locking spring arm 142 by the grounding aperture 176 such that the grounding spring ramp 172 is cantilevered. The grounding contact 174 is positioned at the free end of the grounding spring ramp 172. According to the exemplary embodiment shown in FIG. 15, the grounding contact 174 has a plurality of pointed teeth (e.g., that engage with the contact rail 234 of the frame capture 230 of the frame assembly 210 of the solar module 200).

As shown in FIG. 15, the guide 180 includes a first portion, shown as portion 182, extending rearward from the mounting end 143 of the of the locking spring arm 142 at an upward sloping angle; a second portion, shown as portion 184, extending rearward and substantially horizontally from the portion 182; and a third portion, shown as portion 186, extending rearward from the portion 184 at a downward sloping angle such that the guide 180 has a trapezoidal-like shape. In other embodiments, the guide 180 has another shape (e.g., an arcuate shape, etc.). In some embodiments, the grounding locks 140 of FIGS. 2, 7, and 8 include the guide 180. According to an exemplary embodiment, the guide 180 is flexible or spring-loaded and is configured to at least partially flex or pivot to guide the leading edge of the contact rail 234 of the frame capture 230 of the frame assembly 210 onto the grounding lock 140 and into engagement with the grounding spring ramp 172 as the frame assembly 210 is slid into engagement with the mounting assembly 40 and locked in place by the locking flanges 158 of the grounding locks 140.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the solar racking system 10 and the components thereof (e.g., the racking assembly 20, the mounting assembly 40, the rail assemblies 50, the solar module 200, the frame assembly 210, etc.) as shown in the various exemplary embodiments is illustrative only. Additionally, any element disclosed in one embodiment may be incorporated or utilized with any other embodiment disclosed herein.

The invention claimed is:

1. A solar racking system comprising:
   a rail having a bottom wall and a sidewall extending upward from the bottom wall;
   a clamp assembly configured to couple the rail to a support; and
   a grounding lock including:
      an arm having a first end and an opposing second end;
      a mounting interface coupling the arm to the sidewall;
      a grounding interface extending from the arm between the first end and the opposing second end; and
      a locking interface extending from the opposing second end, and including a first tab having a tapered profile and a second tab having a non-tapered profile;
   wherein the rail and the grounding lock are configured to engage with a frame assembly of a solar module to (i) ground the solar module and (ii) provide fastener-less mounting of the solar module.

2. The solar racking system of claim 1, wherein the mounting interface is positioned proximate the first end of the arm and the grounding interface is positioned proximate the mounting interface.

3. The solar racking system of claim 1, wherein the grounding interface is configured to bias against a portion of the frame assembly of the solar module.

4. The solar racking system of claim 3, wherein the grounding interface includes a cantilevered arm or a cantilevered ramp.

5. The solar racking system of claim 4, wherein a free end of the grounding interface includes a plurality of teeth.

6. The solar racking system of claim 1, wherein the bottom wall of the rail defines a first aperture and a second aperture, wherein the clamp assembly includes a first clamp arm including a first retainer and a second clamp arm including a second retainer, and wherein the first retainer extends into the first aperture and the second retainer extends into the second aperture.

7. The solar racking system of claim 1, wherein the grounding lock includes a guide extending rearward from the first end, and wherein the guide is configured to guide a leading edge of a portion of the frame assembly as the frame assembly engages with the rail and the grounding lock.

8. The solar racking system of claim 7, wherein the guide is flexible or spring-loaded.

9. The solar racking system of claim 7, wherein the guide has an arcuate shape or a trapezoidal-like shape.

10. The solar racking system of claim 1, wherein the sidewall terminates with a lip.

11. The solar racking system of claim 10, wherein the lip defines a first aperture through which a portion of the locking interface extends and retracts.

12. The solar racking system of claim 11, further comprising the frame assembly of the solar module, the frame assembly including:
   a frame defining a second aperture positioned to align with the first aperture and receive the portion of the locking interface; and
   a frame capture extending from the frame, the frame capture configured to engage with the lip.

13. A solar racking system comprising:
   a first rail assembly; and
   a second rail assembly;
   wherein the first rail assembly and the second rail assembly are configured to engage with a solar module; and
   wherein each of the first rail assembly and the second rail assembly includes:
      a mounting rail including a bottom wall, a first sidewall extending from a first longitudinal edge of the bottom wall, a second sidewall extending from an opposing second longitudinal edge of the bottom wall, a first lip extending from a first free end of the first sidewall, and a second lip extending from a second free end of the second sidewall, wherein the bottom wall, the first sidewall, and the second sidewall define an internal volume, wherein a longitudinal opening is defined between the first lip and the second lip, wherein at least one of the first lip or the second lip defines a locking aperture, and wherein the bottom wall defines a first clamp aperture and a second clamp aperture;
a first clamp arm having a first end and a second end, the first end including a first retainer that engages with the first clamp aperture of the mounting rail;
a second clamp arm having a third end and a fourth end, the third end including a second retainer that engages with the second clamp aperture of the mounting rail, wherein the second end of the first clamp arm and the fourth end of the second clamp arm are selectively coupled together; and
a grounding lock disposed within the internal volume of the mounting rail, the grounding lock including a locking interface, a grounding interface, and a mounting interface coupled to one of the first sidewall or the second sidewall, wherein the locking interface is configured to selectively retract from the locking aperture and bias back through the locking aperture to secure the solar module in position along the mounting rail, and wherein the grounding interface is configured to bias into engagement with a portion of the solar module to facilitate electrically grounding the solar module.

14. The solar racking system of claim 13, wherein the locking aperture is a first locking aperture, wherein the first lip defines the first locking aperture, and wherein the second lip defines a second locking aperture.

15. The solar racking system of claim 14, wherein the grounding lock is a first grounding lock, wherein the first grounding lock is coupled to the first sidewall, further comprising a second grounding lock coupled to the second sidewall.

16. The solar racking system of claim 13, wherein the locking interface includes a tab having a tapered profile.

17. The solar racking system of claim 13, wherein the grounding lock includes a guide extending from an end thereof, wherein the guide is configured to guide a leading edge of the portion of the solar module as the solar module engages with the mounting rail and the grounding lock, and wherein at least one of (i) the guide is flexible or spring-loaded or (ii) the guide has an arcuate shape or a trapezoidal-like shape.

18. A solar racking system comprising:
a solar module including a frame assembly having:
　a frame defining first interfaces, the frame configured to support a solar panel; and
　a frame channel; and
a racking assembly configured to couple the solar module to a support, the racking assembly including:
　a plurality of rail assemblies configured to be arranged consecutively along the support, the plurality of rail assemblies including a first rail assembly and a second rail assembly that engage with the solar module, each of the plurality of rail assemblies including:
　　a mounting rail defining:
　　　an internal volume;
　　　a longitudinal opening that receives the frame channel of the frame assembly such that the frame channel extends into the internal volume of the mounting rail when the frame assembly engages with the first rail assembly and the second rail assembly; and
　　　a second interface positioned to align with a respective one of the first interfaces of the frame;
　　a clamp configured to couple the mounting rail to the support; and
　　at least one grounding lock disposed within the internal volume of the mounting rail, the at least one grounding lock including:
　　　a mounting flange coupled to an interior surface of the mounting rail;
　　　a locking arm extending from the mounting flange and terminating with a locking flange, the locking flange extending through the respective one of the first interfaces of the frame and the second interface of the mounting rail; and
　　　a grounding interface extending from the locking arm proximate the mounting flange, the grounding interface terminating with an electrical grounding contact, the electrical grounding contact positioned to engage with the frame channel extending into the internal volume of the mounting rail to facilitate electrically grounding the frame assembly.

* * * * *